United States Patent
Rahner

(10) Patent No.: US 8,124,910 B2
(45) Date of Patent: Feb. 28, 2012

(54) LASER MARKED CATV FILTER

(75) Inventor: David Rahner, Camillus, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 1361 days.

(21) Appl. No.: 11/380,960

(22) Filed: May 1, 2006

(65) Prior Publication Data

US 2007/0252663 A1   Nov. 1, 2007

(51) Int. Cl.
*H03H 7/00* (2006.01)
*B23K 26/00* (2006.01)

(52) U.S. Cl. .............................. 219/121.69; 219/121.82

(58) Field of Classification Search ........... 219/121.63–121.72, 121.85, 121.82
See application file for complete search history.

(56) References Cited

U.S. PATENT DOCUMENTS

| | | | |
|---|---|---|---|
| 4,335,295 A * | 6/1982 | Fowler ..................... | 219/121.85 |
| 5,049,721 A | 9/1991 | Parnas et al. | |
| 5,095,204 A * | 3/1992 | Novini ...................... | 250/223 B |
| 5,111,523 A | 5/1992 | Ferlier et al. | |
| 5,130,721 A | 7/1992 | Sukhman | |
| 5,310,989 A * | 5/1994 | Russell et al. ........... | 219/121.68 |
| 5,474,627 A | 12/1995 | Carriere et al. | |
| 5,477,023 A | 12/1995 | Schneider et al. | |
| 6,143,587 A * | 11/2000 | Omizo ......................... | 438/106 |
| 6,282,807 B1 * | 9/2001 | Johnson ......................... | 33/733 |
| 6,370,304 B1 | 4/2002 | Mills et al. | |
| 6,421,159 B1 | 7/2002 | Sutter et al. | |
| 6,560,390 B2 | 5/2003 | Grulick et al. | |
| 6,613,161 B2 | 9/2003 | Zheng et al. | |
| 6,838,639 B2 | 1/2005 | Kreuter et al. | |
| 7,328,704 B2 * | 2/2008 | Voorhees ....................... | 128/845 |
| 2001/0016982 A1 * | 8/2001 | Blair et al. ..................... | 29/831 |
| 2001/0023858 A1 | 9/2001 | Moss et al. | |
| 2002/0062537 A1 | 5/2002 | Boldy | |
| 2003/0047538 A1 * | 3/2003 | Trpkovski ..................... | 216/84 |
| 2005/0054126 A1 * | 3/2005 | Matsunami ..................... | 438/15 |
| 2005/0133715 A1 * | 6/2005 | Zhu et al. ..................... | 250/288 |
| 2005/0257581 A1 | 11/2005 | Voorhees | |
| 2007/0008227 A1 * | 1/2007 | Napoles et al. ............... | 343/702 |

FOREIGN PATENT DOCUMENTS

| | | |
|---|---|---|
| GB | 2269782 A | 2/1994 |
| WO | 9411146 A1 | 5/1994 |

* cited by examiner

*Primary Examiner* — Samuel M Heinrich
(74) *Attorney, Agent, or Firm* — Schmeiser Olsen & Watts

(57) ABSTRACT

A CATV filter assembled inside a housing has the housing marked by a laser system with indicia relating to specific characteristics of the filter. The housing is thus not mechanically deformed during the step of marking, resulting in unchanged RF characteristics of the filter as a result of the marking.

2 Claims, 2 Drawing Sheets

LASER MARKED CATV FILTER

FIELD OF THE INVENTION

This invention relates generally to the field of cable television (CATV) filters, and more particularly to laser marking for identification of a CATV filter.

BACKGROUND OF THE INVENTION

Cable television (CATV) filters typically block channels from the full spectrum of channels offered to provide a limited or basic service to a subscriber at a lower price. Other CATV filters permit certain channels to pass through the filter while blocking the remainder. Because different models of filters block different groups of premium channels, the model numbers of the CATV filters are permanently printed, typically by roll stamping, into the metal housing of the filter. The filter tube is inserted into a support arbor after which raised hardened metal characters are rolled over the filter tube to leave an impression in the metal filter tube. Printed labels and ink labels are inadequate because of the filters' exposure to the environment and become impossible to read after sufficient exposure to the elements.

In addition, users are now requesting even more information to be permanently printed onto the filters, e.g., bar codes and/or serial numbers to control better the use of the filters. It is not practical to stamp such information on the filters using roll stamping.

Furthermore, stamping can deform the housing and change the internal characteristics of the performance of the filter, which fact can cause elaborate work-arounds when fabricating CATV filters.

SUMMARY OF THE INVENTION

Briefly stated, a CATV filter assembled inside a housing has the housing marked by a laser system with indicia relating to specific characteristics of the filter. The housing is thus not mechanically deformed during the step of marking, resulting in unchanged RF characteristics of the filter as a result of the marking.

According to an embodiment of the invention, a method includes the steps of providing a CATV filter assembled inside a housing; and marking, with a laser system, an outside of the housing with indicia relating to specific characteristics of the filter, wherein the housing is not mechanically deformed during the step of marking, therein resulting in unchanged RF characteristics of the filter as a result of the step of marking.

According to an embodiment of the invention, a marked device includes a CATV filter assembled inside a housing; and an outside of the housing being laser-marked by a laser system with indicia relating to specific characteristics of the filter, wherein the housing is not mechanically deformed during the marking, therein resulting in unchanged RF characteristics of the filter as a result of the marking.

DETAILED DESCRIPTION OF THE PREFERRED EMBODIMENT

According to an embodiment of the invention, a workpiece such as an outer shell or sleeve of a cable TV system component, which component preferably being a trap or surface mount product, is marked with indicia relating to specific characteristics of the system component such as the part number or other information, with the indicia preferably being a logo, bar-coding, date-coding, 2-D Matrix, or similar.

The marking is preferably done with a laser, and preferably an excimer laser or pulsed solid state laser such as the VersaScribe GM Laser Marking System manufactured by Alase Technologies, Inc. According to Alase, VersaScribe GM YAG Laser Engraving Systems are designed to bring precision, reliability, versatility, and speed to the most demanding applications, with WinLase Software allowing for applications ranging from deep engraving to fine surface annealing.

The VersaScribe YAG laser features q-switched, flash lamp technology for high laser energy densities and proven reliability. The laser preferably operates in TEMoo mode. Because the internal Q-switch is software controlled, the operator has the flexibility to change the laser beam power characteristics for marking materials such as steel, aluminum and soft plastics. The VersaScribe laser is a high performance Nd:YAG Laser Marker, with 80 watts CW at 1064 nm.

The laser marking is preferably done at 90% power, 4 Khz with a marking speed of 500 mm/sec. This setting is used for both the stainless and brass cases. The etch depth is no greater than 0.0002" so that the base material is not exposed causing corrosion.

Figure 1:
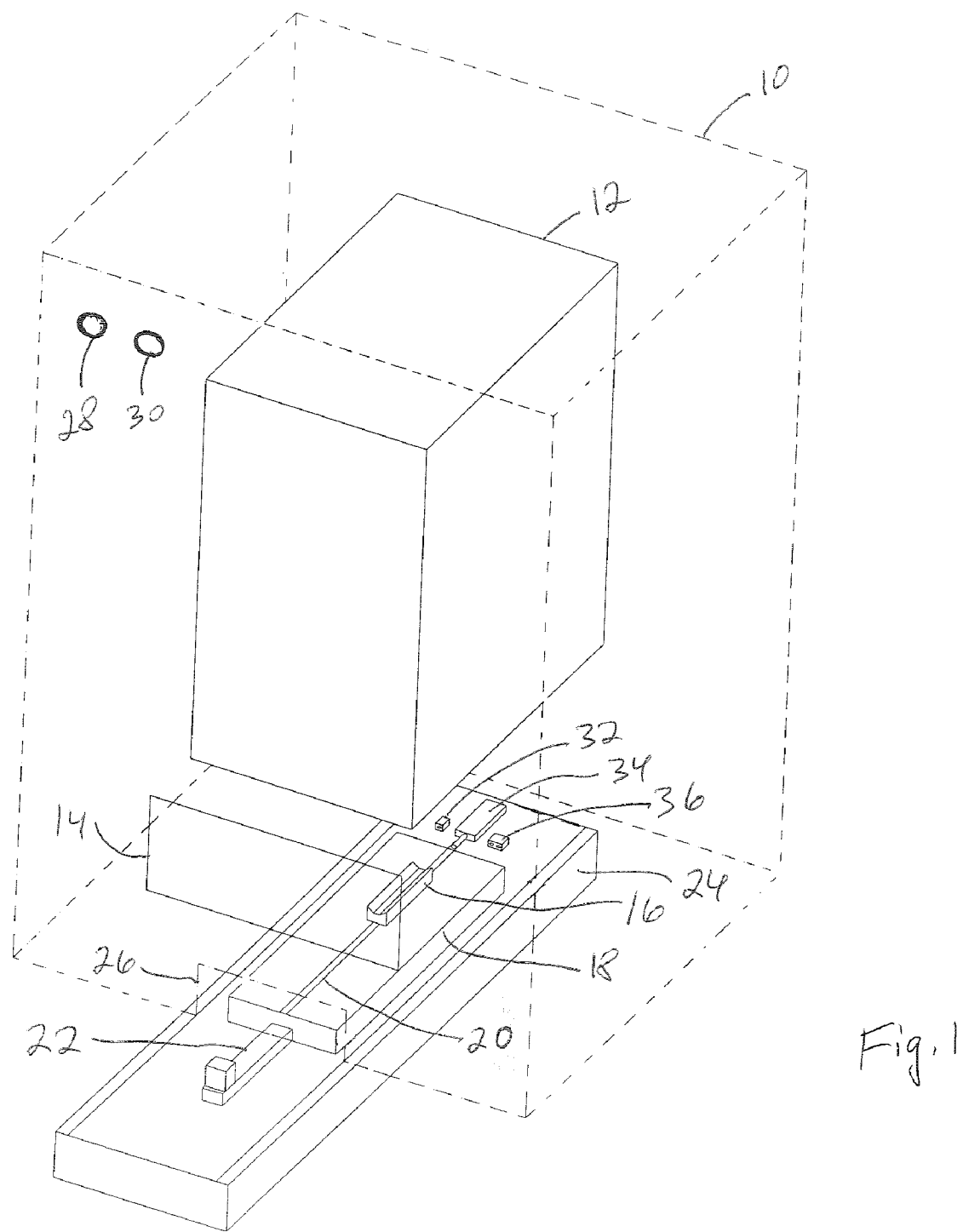
FIG. 1 shows a laser system according to an embodiment of the present invention.

Referring to FIG. 1, an optically enclosed shroud 10 is preferably placed over a laser 12 and workpiece (not shown) such that an operator can view the workpiece through a viewing window 14 laser safety viewing glass. Multiple interlocks to laser 12 preferably prevent operation of laser 12 with shroud 10 out of position. An "Emergency Stop" (not shown) is preferably located on a laser control box PLC (FIG. 2) within easy reach of the operator at all times. A quick-release latching (not shown) on shroud 10 preferably allows access for maintenance.

To maintain the focal point of etching on the workpiece, a fixture 16 is preferably of the shuttle type with exchangeable inserts to accommodate various sleeve types, with the diameters of the sleeve types ranging from a trap sleeve to a SMT sleeve. Fixture 16 is connected to a fixture plate 18. Fixture plate 18 is in turn slideably connected via a shuttle groove 20 to a platform 24. Fixture plate 18 is slideable in and out through an opening 26 in shroud 10 using a slide handle 22. A large green LED 28 is preferably mounted in shroud 10 to indicate that laser 12 is inactive, with a red LED 30 to identify the active state.

Figure 2:
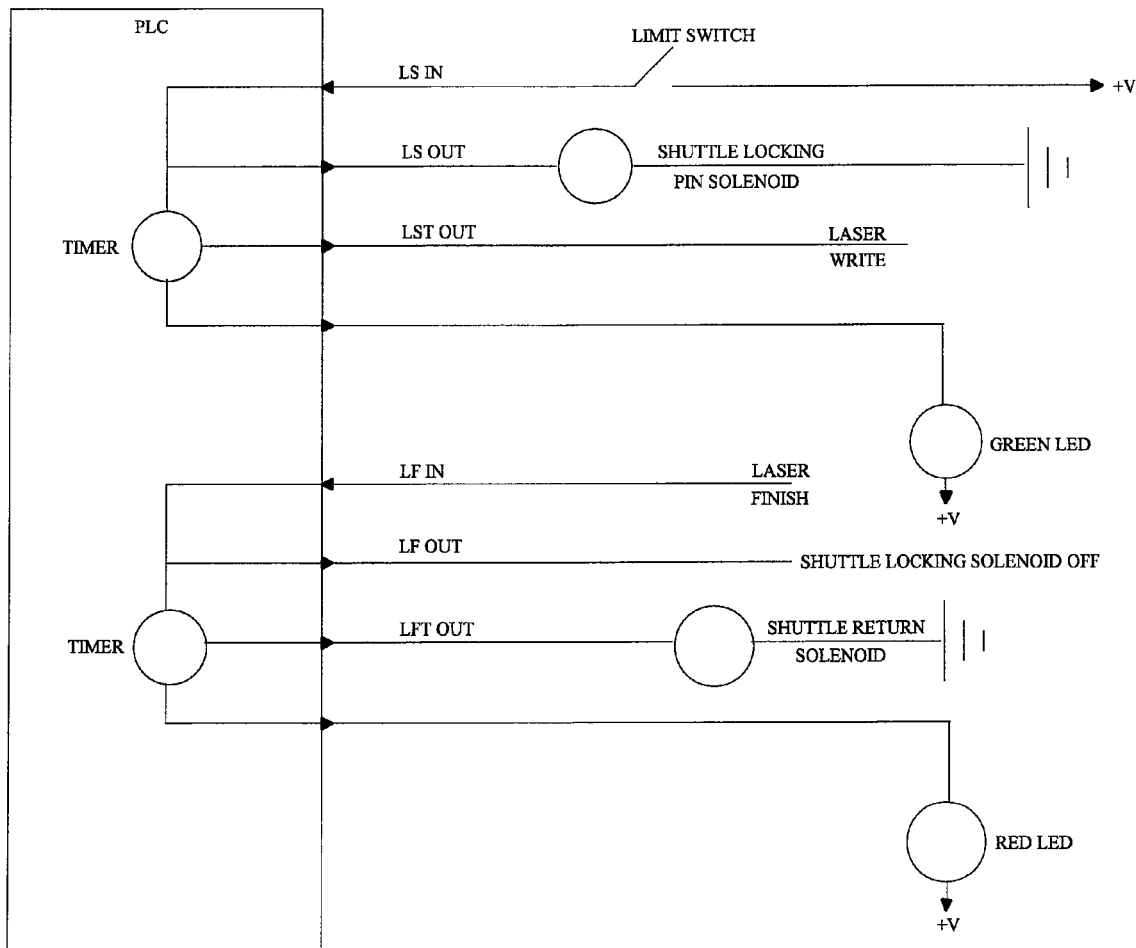
FIG. 2 shows a schematic of the laser and laser control circuitry associated with the embodiment of FIG. 1.

The process is as follows. The operator inserts the sleeve by hand into fixture 16 on fixture plate 18. Fixture plate 18 is shuttled into shroud 10 by the operator via slide handle 22 until fixture plate 18 reaches a shuttle stop 36. Laser 12 is preferably activated by a sensor such as limit switch 32 detecting the presence of fixture plate 18 and the sleeve. Upon completion of the laser etch, laser control PLC preferably activates a solenoid 34 which returns fixture plate 18 and fixture 16 for another unload/load cycle of the sleeve. A schematic for the laser and control circuitry is shown in FIG. 2. When the workpiece is a filter assembly which includes a housing and a filter disposed inside the housing, the housing is un-deformed by this laser marking operation.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method, comprising the steps of:

providing a CATV filter assembled inside a housing; and marking, with a laser system, an outside of the housing with indicia relating to specific characteristics of the filter, wherein the housing is not mechanically deformed during the step of marking, therein resulting in unchanged RF characteristics of the filter as a result of the step of marking;

wherein the laser system comprises:
- a laser;
- a laser control circuit for the laser,
- an optical shroud fitted over the laser and housing;
- an opening in the optical shroud;
- a fixture plate moveable through the opening from outside the optical shroud to inside the optical shroud;
- a fixture removably mounted on the fixture plate for holding the housing;
- a window in the optical shroud whereby an operator can see the housing;
- a shuttle stop which physically stops the fixture plate when the fixture plate is in position for laser marking of the housing;
- a limit switch which activates the laser when the fixture plate is in position for laser marking of the housing; and
- a shuttle return solenoid which moves the fixture plate out of the optical shroud when the laser is finished marking the housing.

2. A method according to claim 1, wherein the marking is to a depth in the housing not to exceed 0.0002 inches.

* * * * *